(12) United States Patent
Andresen et al.

(10) Patent No.: US 9,531,193 B2
(45) Date of Patent: Dec. 27, 2016

(54) METHOD AND ARRANGEMENT FOR OPERATING A WIND FARM WITHIN VOLTAGE LIMIT

(75) Inventors: Björn Andresen, Ostbirk (DK); Yin Bo, Brande (DK); Knud Dam Hageman Madsen, Galten (DK)

(73) Assignee: SIEMENS AKTIENGESELLSCHAFT, München (DE)

(*) Notice: Subject to any disclaimer, the term of this patent is extended or adjusted under 35 U.S.C. 154(b) by 623 days.

(21) Appl. No.: 13/551,055

(22) Filed: Jul. 17, 2012

(65) Prior Publication Data

US 2013/0026756 A1 Jan. 31, 2013

(30) Foreign Application Priority Data

Jul. 27, 2011 (EP) .................... 11175580

(51) Int. Cl.
*H02P 9/04* (2006.01)
*H02J 3/50* (2006.01)
*F03D 9/00* (2016.01)
*H02J 3/18* (2006.01)
*H02J 3/38* (2006.01)

(52) U.S. Cl.
CPC ............... *H02J 3/50* (2013.01); *F03D 9/005* (2013.01); *H02J 3/1885* (2013.01); *H02J 3/386* (2013.01); *Y02E 10/72* (2013.01); *Y02E 10/763* (2013.01); *Y02E 40/32* (2013.01)

(58) Field of Classification Search
CPC .................................................. H02J 3/1885
USPC ....................................................... 700/287
See application file for complete search history.

(56) References Cited

U.S. PATENT DOCUMENTS

| 7,923,862 | B2 | 4/2011 | Larsen |
| 2008/0150283 | A1* | 6/2008 | Rivas .............. H02J 3/1885 290/44 |
| 2010/0025994 | A1* | 2/2010 | Cardinal et al. ............... 290/44 |
| 2010/0085987 | A1 | 4/2010 | Nagai |
| 2010/0244787 | A1 | 9/2010 | Lefaix |

(Continued)

FOREIGN PATENT DOCUMENTS

| CN | 101640419 A | 2/2010 |
| CN | 101861690 A | 10/2010 |

(Continued)

OTHER PUBLICATIONS

Garcia, Jorge Martinez; "Voltage in Wind Power Plants with Doubly Fed Generators"; Ph.D. Thesis; Department of Energy Technology; Aalborg University; Sep. 2010; ISBN: 978-87-89179-92-6; 2010; DK.

(Continued)

*Primary Examiner* — Mohammad Ali
*Assistant Examiner* — Emilio J Saavedra

(57) ABSTRACT

A method for determining a limit value of a wind turbine reference operational variable is described The wind turbine being connected to a connection node to which a utility grid is connected. The method includes: obtaining a first input signal indicative of a connection node limit voltage; obtaining a second input signal indicative of a connection node voltage; and determining the limit value of the wind turbine reference operational variable based on the first signal and the second signal. Further a corresponding arrangement is described.

10 Claims, 5 Drawing Sheets

(56) References Cited

U.S. PATENT DOCUMENTS

2011/0156389 A1    6/2011    Alonso Sadaba

FOREIGN PATENT DOCUMENTS

| CN | 101938131 A | 1/2011 |
|---|---|---|
| CN | 102007662 A | 4/2011 |
| DE | 10059018 A1 | 6/2002 |
| DE | 102007017870 A1 | 10/2008 |
| EP | 1386078 B1 | 3/2005 |
| EP | 1512869 A1 | 3/2005 |
| EP | 2254217 A2 | 11/2010 |
| EP | 2317135 A1 | 5/2011 |
| WO | WO 02086315 A1 | 10/2002 |
| WO | WO 2006037576 A1 | 4/2006 |
| WO | WO 2009127393 A1 | 10/2009 |
| WO | WO 2010085987 A2 | 8/2010 |

OTHER PUBLICATIONS

Kahlert, Jörg: "Crash-Kurs Regelungstechnik"; VDE-Verlag; ISBN: 978-3-8007-3066-7;; 2010.

e-on Netz; "Netzanschlussregeln Hoch-und Höchstspannung";pp. 1-50; 2006.

\* cited by examiner

METHOD AND ARRANGEMENT FOR
OPERATING A WIND FARM WITHIN
VOLTAGE LIMIT

CROSS REFERENCE TO RELATED
APPLICATIONS

This application claims priority of European Patent Office application No. 11175580.7 EP filed Jul. 27, 2011. All of the applications are incorporated by reference herein in their entirety.

FIELD OF INVENTION

The present disclosure relates to a method and to an arrangement for operating a wind farm in a predetermined voltage limit at a connection node to which the wind turbine or wind farm is connected directly or indirectly, by dynamically modifying a limit value of a wind turbine reference operational value, in particular, a wind turbine voltage reference or a wind turbine reactive power reference, especially when voltage at a connection node is outside predetermined voltage limit.

BACKGROUND

It may be known that wind turbines may be connected to a utility grid, directly or indirectly, in particular via one or more transformers, providing electric energy to multiple consumers. The point of common coupling or point of common connection (PCC)) refers to the point where local regulation or grid code should be satisfied. Electric properties at the point of common connection may be controlled by a park controller or park pilot or wind farm controller or high-performance park pilot (HPPP) to satisfy particular requirements, directly or indirectly.

For example, grid code may become stricter due to large scale wind power penetration. Efforts have been made to allow wind turbine generators to operate as conventional power generation, such as, oil and gas plant.

However, it has been observed that controlling the electrical properties at the point of common coupling may not satisfy in all conditions requirements set by local regulations. Further, it has been observed that failure of the electrical properties at the point of common coupling to satisfy the requirements may lead to penalty from authority of utility or to reduce life span of components of the wind park, instability of the electrical utility grid or other problems, such as low efficiency.

SUMMARY OF THE INVENTION

There may be a need for a method and for an arrangement for determining a limit value of a wind turbine reference operational variable, which ensures or facilitates controlling of one or more wind turbines connected to a connection node such that electrical properties at PCC satisfy predetermined conditions or requirements.

In particular, there may be a need for a method and for an arrangement for operating a wind farm within a predetermined limit of electrical properties. Further an objective is to operate a wind farm or wind turbine so that the voltage at the point of common coupling is within predetermined voltage limits.

The need is satisfied by the subject-matter of the independent claims, wherein the dependent claims specify exemplary embodiments.

According to an embodiment, a method for determining (in particular comprising deriving, computing and/or calculating, in particular using one or more electronic circuits or computing units), a limit value (in particular a value indicative of an upper bound and/or a lower bound, wherein the upper bound is intended not to be exceeded and wherein the lower bound is expected not to be undercut) of a wind turbine reference operational variable (in particular an operational quantity controlling the operation of the wind turbine regarding power production, reactive power production and/or reactive current production and/or voltage, which is output to the point of common coupling or to the connection node, the reference operational variable in particular comprising a reference voltage and/or a reference reactive power of the wind turbine at an output terminal of the wind turbine) is provided, wherein the wind turbine is connected to a connection node (also referred to as point of common coupling), to which a utility grid (providing electric energy to a plurality of consumers) is connected, wherein in particular, a plurality of wind turbines is connected to the connection node. Thereby, the method comprises obtaining (in particular comprising receiving, e.g. via an electrical wire, reading from a storage device, inputting by a user, and/or deriving based on local regulations) a first input signal (in particular an electrical and/or optical signal) indicative of a connection node limit voltage (defining a limit voltage, such as an upper limit voltage and/or a lower limit voltage, to be achieved at the connection node or at another position different from the connection node but electrically connected to the connection node, such as at a high-voltage side of a park transformer, wherein the connection node limit voltage, when comprising a connection node upper limit voltage and a connection node lower limit voltage, thus defines a desired or intended voltage range within which the actual connection node voltage or the voltage at the other point should lie). Further, the method comprises obtaining (in particular comprising measuring, supplying, transforming, and/or calculating) a second input signal (such as an electrical and/or optical signal) indicative of a connection node voltage (in particular indicating the actual voltage, which is present at the connection node or at still another point, such as at a high-voltage side of a park transformer, the still another point being different from the connection node but being electrically connected to the connection node, wherein the connection node may comprise two or more phases and the connection node voltage may be obtained by measuring one or more voltages between the two or more phases at the connection node). Further, the method comprises determining (in particular comprising running the first input signal and/or the second input signal through a circuit or supplying the first input signal and/or the second input signal to a computer program running on a processing system, wherein the determining may comprise calculations, control procedures, derivations, computations and the like) the limit value (in particular the voltage limit or/and the reactive power limit) of the wind turbine reference operational variable based on the first signal and the second signal such that the limit value of the wind turbine reference operational variable depends on the first signal and the second signal such that the limit value of the wind turbine reference operational variable changes, when one of the first signal and the second signal changes.

If the first signal relates to a limit voltage at another point different form the connection node and/or the second node relates to a voltage a still another point, the respective voltages or limits may be converted to a reference point, such as the connection node.

In particular, a park controller could be installed at a location different from point where grid code should be satisfied. E.g. the park controller may be installed at either low voltage side (LV) or high voltage (HV) side of a park transformer connected between the connection node (or point of common coupling) and the utility grid. Grid code or voltage limits should be satisfied most likely at HV side of the transformer. If the park controller has been installed at the LV side of transformer, grid code requirement for PCC should be converted to equivalent requirement at location where the park controller is installed.

In particular, thus, the connection node limit voltage (which may be set according to local regulations, according to user input or the like) may be taken into account to determine (in particular comprising calculating, computing, and/or deriving) the limit value of the wind turbine reference operational variable such that the actual voltage at the connection node stays within the intended voltage range defined by e.g. the connection node upper limit voltage and the connection node lower limit voltage. Thereby, it may be ensured that the electrical properties at the point of common coupling or connection node stay within intended ranges. Thereby, the security of a wind turbine may be improved and a wind park controlled using the method for determining the limit value of the wind turbine reference operational variable, may be operated in a safe manner, simultaneously meeting requirements according to local regulations.

In particular, the determined limit value of the wind turbine reference operational variable may then be used to actually control the wind turbine operational variable to be in the determined limit.

According to an embodiment, the limit value of the wind turbine reference operational variable comprises an upper limit value (such as an upper voltage limit, which should not be superseded at the output of the wind turbine) of the wind turbine reference operational variable (such as the wind turbine reference voltage or the wind turbine reference reactive power) and the first input signal comprises a first upper limit input signal indicative of an upper limit (which should not be superseded at the connection node) of the connection node voltage. Thereby, an upper bound of the wind turbine reference operational variable may be set and/or defined and a turbine reference operational variable below this upper bound may subsequently be supplied to the wind turbine.

According to an embodiment, the limit value of the wind turbine reference operational variable further comprises a lower limit value (such as a lower voltage limit or a lower reactive power limit, which should not be undercut at the wind turbine output, such that the output of the wind turbine lies above the lower limit value and in particular lies below the upper limit value) and the first input signal comprises a first lower limit input signal indicative of a lower limit (which should not be undercut such that the connection node voltage lies above the lower limit) of the connection node voltage.

Thereby, the first input signal may e.g. be indicative of an intended voltage range in which the voltage at the connection node should stay. Further, the limit value of the wind turbine reference operational variable may thus define an intended range of the reference operational variable at the output of the wind turbine. In particular, when the intended range of the voltage at the connection node is defined, a corresponding range of the wind turbine reference operational variable may be defined by in particular determining the upper limit value and also the lower limit value of the wind turbine reference operational variable.

Bounding the reference operational variable of the wind turbine between the upper limit value and the lower limit value may ensure that the connection node voltage is maintained within the intended range of the connection node voltage, wherein the intended range of the connection node voltage may be defined by the first upper limit input signal indicative of an upper limit of the connection node voltage and the first lower limit input signal indicative of a lower limit of the connection node voltage.

According to an embodiment, the method further comprises determining a difference between the first input signal and the second input signal, wherein the determining the limit value of the wind turbine reference operational variable is based on the determined difference, wherein the determined difference is in particular used as a feedback signal supplied to a feedback controller.

In particular, the limit value may depend on the determined difference, such that the limit value changes, if the determined difference changes. In particular, the difference between the first input signal and the second input signal may be indicative of a deviation of the connection node limit voltage and the (actual) connection node voltage.

In particular, the difference may be indicative of a distance between an upper limit of the connection node voltage and the actual connection node voltage and/or indicative of a distance between a lower limit of the connection node voltage and the actual connection node voltage.

The feedback controller may e.g. comprise a PID controller.

Thereby, the method may be simplified.

According to an embodiment, the method further comprises scaling (in particular comprising applying a proportional control element for increasing or decreasing) the difference to obtain a scaled difference; and integrating (in particular comprising performing a summation of one or more samples taken at subsequent time points) the scaled difference over a time interval (such as between 0.1 ms and 10 s) to obtain an integrated scaled difference, wherein the determining the limit value (in particular the upper limit value and/or the lower limit value) of the wind turbine reference operational variable (in particular the reference voltage and/or the reference reactive power) is based on the integrated scaled difference, wherein in particular the limit value of the wind turbine reference operational variable is also based on the scaled difference.

In other embodiments another control algorithm may be used to obtain the limit value.

Thereby, in particular, a PI-control section may be used providing a proportional modification element and an integration modification element for modifying the determined difference. Thereby, conventional electronic circuits may be utilized or conventional computational procedures may be applied. Thereby, the costs of an arrangement for determining the limit value may be decreased and the method may be accelerated. Further, the method may have increased accuracy.

Another controller other than a proportional controller may also be applied.

According to an embodiment, the method further comprises obtaining (in particular comprising calculating, inputting and/or deriving) a preliminary upper limit value (such as a preliminary upper voltage limit or a preliminary upper reactive power limit) of the wind turbine reference operational variable (in particular the wind turbine reference voltage or the wind turbine reference reactive power); obtaining a preliminary lower limit value (in particular a lower voltage limit or a lower reactive power limit) of the wind turbine reference operational variable, wherein the determining the limit value of the wind turbine reference operational variable is further based on the preliminary upper limit value and the preliminary lower limit value, wherein in particular the limit value is limited to be within a range defined by the preliminary upper limit value and the preliminary lower limit value.

In particular, when the limit value comprises an upper limit value, the upper limit value may be limited to be within the range defined by the preliminary upper limit value and the preliminary lower limit value. In particular, if the limit value comprises the lower limit value, the lower limit value may be limited to be within a range defined by the preliminary upper limit value and the preliminary lower limit value. In particular, the preliminary lower limit value and the preliminary upper limit value may depend on the actual operational condition of the wind turbine, such as on the wind turbine reference voltage and/or wind turbine reference reactive power.

According to an embodiment, the method further comprises limiting a rate change (a change with respect to time) of the limit value (in particular the upper limit value and/or the lower limit value) of the wind turbine reference operational variable to a predetermined weight change range. Thereby, the method may further be improved, while ensuring that the connection node voltage stays within the intended range of the voltage at the connection node.

According to an embodiment, the method further comprises controlling (in particular comprising supplying a signal to the wind turbine, in particular to a converter of the wind turbine) the reference operational variable (in particular, the reference voltage or the reference reactive power) of the wind turbine based on the determined limit value of the wind turbine reference operational variable.

In particular, a signal may be supplied to the wind turbine such that the reference operational variable of the wind turbine stays within the defined range of the reference operational variable. Alternatively, a signal indicative of the limit value itself (in particular a lower limit value and/or an upper limit value) may be supplied to the wind turbine, when the connection node voltage is outside the connection node limit voltage.

Thereby, the output of the wind turbine finally depends on the connection node limit voltage, in particular the connection node upper limit voltage and the connection node lower limit voltage. Thereby, it may be ensured that the wind turbine outputs an appropriate reactive power or voltage such that the voltage at the connection node stays within the intended range of the connection node voltage, wherein the intended range of the connection node voltage may be defined by the connection node upper limit voltage and the connection node lower limit voltage.

According to an embodiment, the controlling is performable during at least the following operational modes of the turbine or of the wind park comprising a plurality of wind turbines: reactive power control at the connection node (such as to control a reactive power at the connection node); or voltage control at the connection node (such as to control the voltage at the connection node); or power factor control at the connection node (such as to control the power factor at the connection node), wherein the operational modes are performable temporarily separated from each other.

Hereby the connection node may refer to the point where park controller has been installed. In particular, the connection node may refer to a low voltage side or a high voltage side of a park transformer, wherein one or a plurality of wind turbines may be connected to the low voltage side of the park transformer and the utility grid may be connected to the high voltage side of the park transformer.

The operational modes may be adopted during particular situations depending on the application. Thereby, the method may be applied in a number of cases and conditions.

According to an embodiment, during reactive power control at the connection node the reference operational variable of the wind turbine is further based on a reference reactive power $Q\_WFREF$ at the connection node and a measured reactive power $Q\_PCC$ at the connection node; during voltage control at the connection node the reference operational variable of the wind turbine is further based on a reference voltage at the connection node and a measured voltage at the connection node; and during power factor control at the connection node the reference operational variable of the wind turbine is further based on a reference power factor at the connection node and a measured power factor at the connection node.

In particular, the method for determining a limit value of a reference operational variable, the power control at the connection node, the voltage control at the connection node, and/or the power factor control at the connection node may be performed by a park pilot or park controller controlling the wind park, in particular a plurality of wind turbines comprised in the wind park. Thereby, in particular, electrical properties of the grid and/or at the connection node may be measured and supplied to the park pilot or park controller.

According to an embodiment, the preliminary upper limit value (in particular, the preliminary upper voltage limit or the preliminary upper reactive power limit) of the wind turbine reference operational variable is based on the reference operational variable of the wind turbine (thereby providing a feedback), and/or the preliminary lower limit value (in particular the preliminary lower voltage limit and the preliminary lower reactive power limit) of the wind turbine reference operational variable is based on the reference operational variable of the wind turbine (thereby further providing feedback). Thereby, the method may further be improved, whereas it is ensured that the connection node voltage stays within the intended voltage range.

According to an embodiment, the obtained second input signal indicative of a connection node voltage comprises measuring the connection node voltage (in particular using a measurement facility, such as a voltage sensor).

The measured voltage may be supplied to the park pilot or park controller by an electric wire or by a wireless communication method.

According to an embodiment, the wind turbine reference operational variable is a wind turbine reference voltage and the limit value of the wind turbine reference operational variable is a voltage limit of the wind turbine reference voltage.

Alternatively, the wind turbine reference operational variable is a wind turbine reference reactive power and the limit value of the wind turbine reference operational variable is a reactive power limit of the wind turbine reference reactive power.

In particular, the wind turbine may be controlled using either a reference voltage or a reference reactive power. Thereby, these operational variables (i.e., the reference voltage and the reference reactive power) may be interrelated and may depend on each other and may equivalently be used to control the wind turbine. For example, for providing a particular reference voltage at the wind turbine, a particular reference reactive power may be required and for providing a particular reference reactive power a particular reference voltage may be required. Setting the reference voltage may at the same time set a particular reference reactive power and vice versa.

It should be understood, that features (individually or in any combination) disclosed, described, mentioned or used for or employed for a method for determining a limit value of a wind turbine reference operational variable may also be applied, used for, and/or employed (individually or in any combination) with an arrangement for determining a limit value of a wind turbine reference operational variable and vice versa.

According to an embodiment, it is provided an arrangement for determining a limit value of a wind turbine reference operational variable, the wind turbine being connected to a connection node to which a utility grid is connected, the arrangement comprising: an input for obtaining a first input signal indicative of a connection node limit voltage and for obtaining a second input signal indicative of a connection node voltage; and a determining section for determining the limit value of the wind turbine reference operational variable based on the first signal and the second signal.

The arrangement for determining a limit value may be a portion or a section of a park pilot or a park controller controlling a plurality wind turbines commonly connected to the connection node.

Further, a wind park comprising a plurality wind turbines is provided, wherein the wind turbines are controlled by a park pilot or park controller which performs the method according to an embodiment as described above.

It has to be noted that embodiments have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects are apparent from the examples of embodiment to be described hereinafter and are explained with reference to the examples of embodiment. The invention will be described in more detail hereinafter with reference to examples of embodiment but to which the invention is not limited.

Embodiments are now describes with reference to the accompanying drawings. The invention is not restricted to the described or illustrated embodiments.

DETAILED DESCRIPTION

Figure 1:
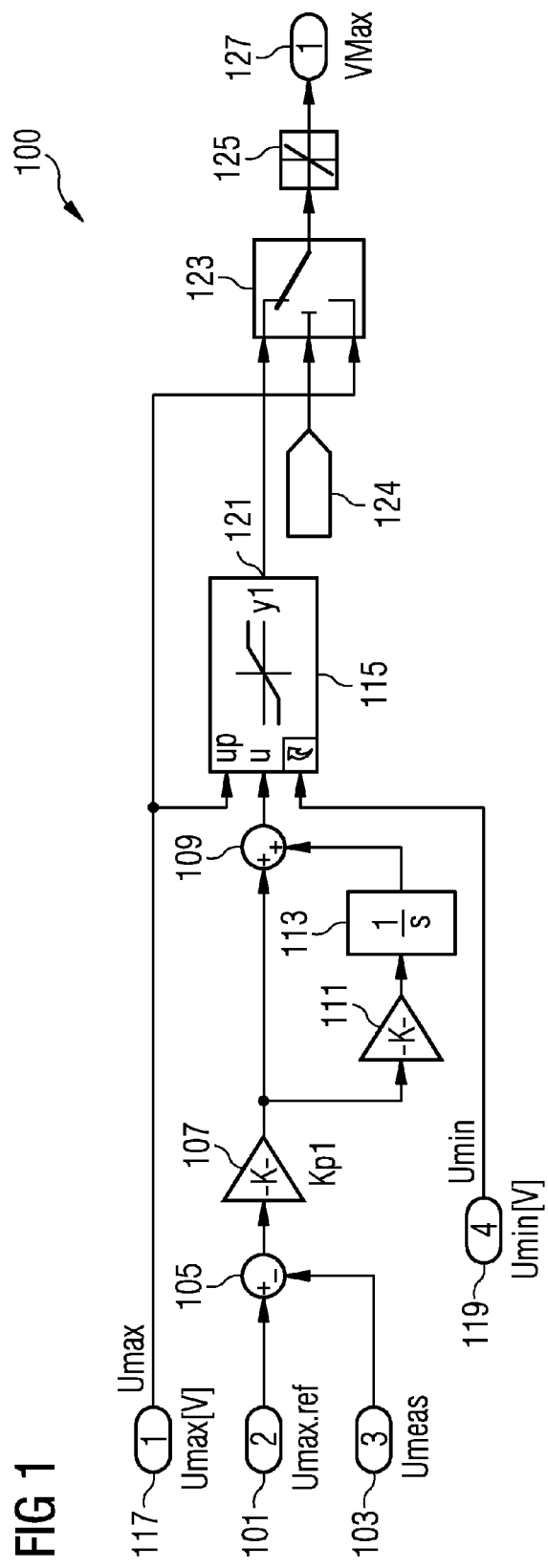
FIG. 1 schematically illustrates an upper voltage limit bound controller according to an embodiment.

The wind farm Park Pilot Voltage and Power and/or Frequency Controllers may be connected to the HV-side (e.g. 132 kV) of the Park transformer of the wind farm or LV-side of park transformer. The Point of Common Connection (PCC-point) voltage and frequency dependent active power are controlled by adjusting the voltage and power reference of the wind turbines connected to the collector grid (operating e.g. at 33 kV). Each turbine controls the local WTG voltage and power generation to the voltage and power reference value respectively as the Park Pilot Voltage and Frequency Controllers are dispatching to the reference inputs of the wind turbines.

For example, a wind farm controller may measure voltage and/or current signals at PCC and may feed them into wind farm controller to generate references to individual wind turbines. Reference could be related to active power of wind turbines, voltage reference of wind turbines or reactive power of wind turbines.

In some other scenarios, the voltage at PCC may be regulated based on some specific slope characteristic. Therefore, a voltage controller could be implemented in the wind farm controller in order to regulate voltage at PCC to follow slope characteristic.

In some other scenarios, reactive power at PCC may be controlled to a specific value. Therefore, a reactive power controller could be implemented in the wind farm controller in order to regulate reactive power at PCC.

In another scenario, power factor at PCC may be controlled to a specific value. Therefore, a power factor controller could be implemented in the wind farm controller in order to regulate a power factor at PCC.

Wind turbines may be actuators of wind farm controller. The output of the above controllers may be used as reference signal(s) to individual turbine. Conventionally, the output of the above controller may be limited with a hard limit based on turbine manufacture specification, e.g. [0.9*Unom; 1.1*Unom], with Unom being nominal voltage at LV side of turbine transformer.

The Wind Farm controller provides a fast acting damped PCC response as PCC voltage is changed due to moderate variations in the system voltage or active power generation.

The Wind Farm PCC voltage, active and reactive power are measured via measuring equipment, where also an averaging and filtering of the measured inputs is carried out. The filtered data and PCC frequency are sent via a serial connection to the Park Pilot Controllers, which samples the data at a specified sampling frequency. For each sampling period, the Park Pilot calculates a new voltage and power reference value to the turbines, and these common reference signals are sent via e.g. LAN or other communication technique to the respective voltage and power reference inputs of the wind farm turbines in service.

In some grid codes, it is specified that steady state voltage at point of common connection (PCC) shall stay within a given voltage band when reactive power control is performed.

Embodiments relate to limiting steady state voltage at PCC to a certain band by applying additional voltage bound limit controllers. This may be an add-on feature for park pilot controller.

Embodiments may be applied to reactive power control in the park pilot by modifying the dynamic output range of reactive power controller to limit voltage at PCC to a specified range.

Embodiments may be applied also to voltage controller in the park pilot by modifying the dynamic output range of voltage controller to limit voltage at PCC to a specified range.

Embodiments may be applied also to power factor controller in the park pilot by modifying the dynamic output range of power factor controller to limit voltage at PCC to a specified range.

The implementation of voltage bound limit controller may include an upper bound limit controller and lower bound limit controller.

Figure 2:
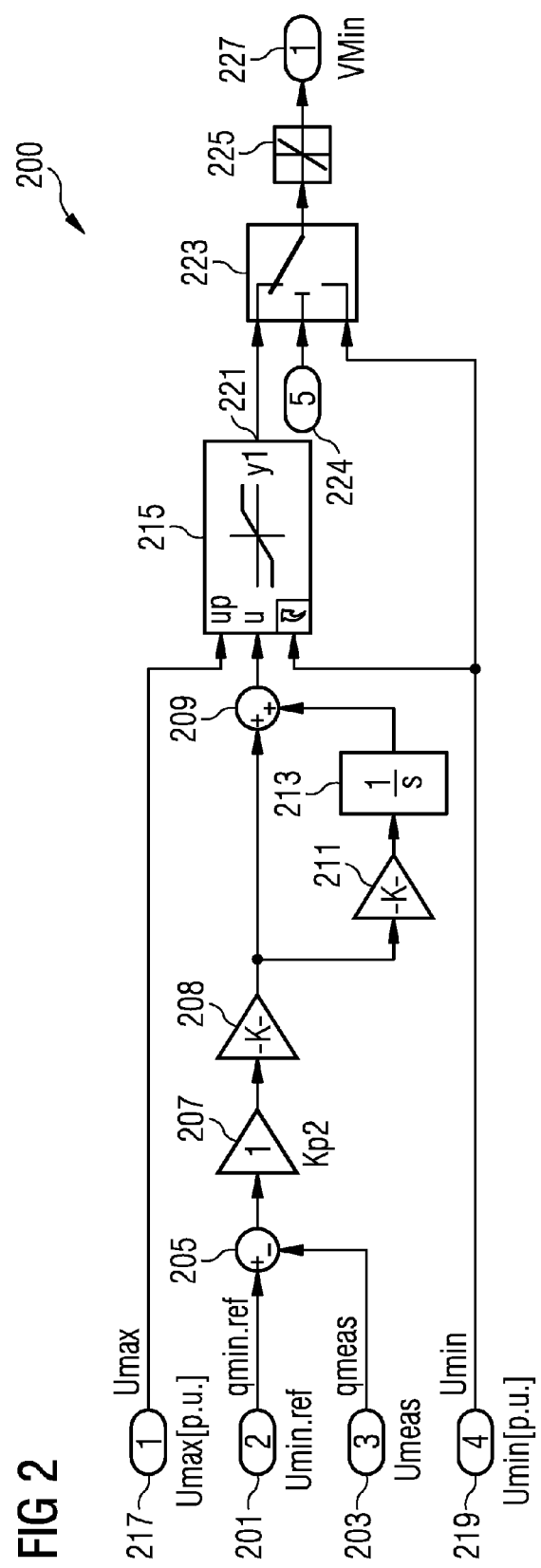
FIG. 2 schematically illustrates a lower voltage limit bound controller according to an embodiment.
Figure 3:
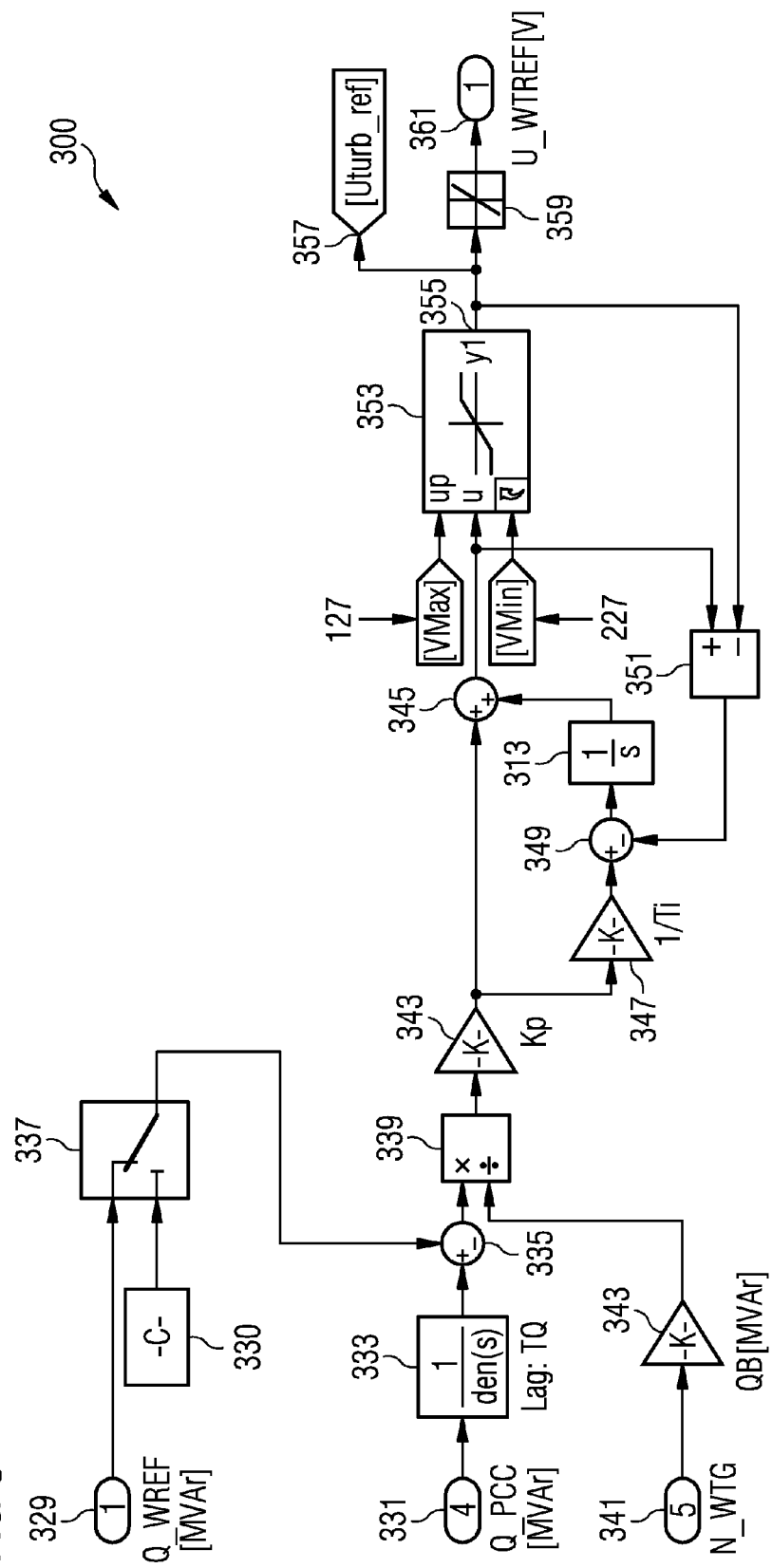
FIG. 3 schematically illustrates an embodiment of a reactive power controller using outputs of the controllers illustrated in FIGS. 1 and 2 for determining a wind turbine reference voltage.

FIGS. 1 to 3 illustrate an example how voltage bound limit controller may be incorporated into the reactive power controller inside park pilot.

The voltage band requirement in grid code is use to define the upper limit and lower limit of voltage bound limit controller, e.g., [$U_{minref}$; $U_{maxref}$] at the connection node.

FIG. 1 schematically illustrates an upper voltage limit bound controller representing an arrangement for determining a limit value of a wind turbine reference operational variable according to an embodiment.

In particular, the upper voltage limit bound controller 100 illustrated in FIG. 1 receives at a first terminal 101 a first input signal indicative of a connection node limit voltage Umaxref, which indicates a connection node upper limit voltage. The connection node upper limit voltage Umaxref represents a voltage at the connection node, which should not be superseded. Thereby, a plurality wind turbines are connected to the connection node. Further, the controller 100 illustrated in FIG. 1, receives at a second terminal 103 a second input signal indicative of a connection node voltage Umeas representing a measured connection node voltage.

Using a subtraction element 105, the measured connection node voltage Umeas is subtracted from the connection node upper limit voltage Umaxref and the result is supplied to a scaling element 107. The result of this scaling element 107 is on one hand supplied to an addition element 109 and on the other hand to a further scaling element 111. The result of the scaling element 111 is supplied to an integrating element 113, which integrates the scaled signal and supplies it also to the addition element 109.

At the addition element 109 the two received signals are added and supplied to a limiting element 115. The limiting element 115 limits the signal received from the adding element 109 to be within the values Umax received at a terminal 117 and Umin received at a terminal 119.

When voltage at PCC is inside the specified voltage range, the voltage limit for reactive power controller, upper voltage bound limit controller and lower voltage bound limit controller are given as $$\begin{cases} U_{max} = Const1 \\ U_{min} = Const2 \end{cases} \quad (1)$$

Thereby, Const1 may be e.g. 1.08 and Const2 may be e.g. 0.92. When voltage bound limit controller is enabled and voltage at PCC is outside voltage range [$U_{minref}$; $U_{maxref}$], new voltage limits will be issued and dynamically modify the output voltage limit of reactive power controller.

Here is an example of the new voltage limits. When voltage bound limit controller is enabled and voltage at PCC is outside voltage range [$U_{minref}$; $U_{maxref}$], new voltage limits will be issued as e.g. according to $$\begin{cases} U_{min} = \max(U_{turb\_ref} - 0.02 * U_{nom}; 0.92 * U_{nom}) \\ U_{max} = \min(U_{turb\_ref} + 0.02 * U_{nom}; 1.08 * U_{nom}) \end{cases} \quad (2)$$

Other equations may be possible. Here $U_{turb\_ref}$ is the output of reactive power controller which is used as voltage reference for individual turbine. Umin and Umax shall be within a range of e.g, [0.92; 1.08].

Please note that the voltage limit may be generated using different rule.

The $U_{min}$ and $U_{max}$ will be used as output limit for both upper voltage limit controller and lower voltage limit controller.

An output terminal 121 of the limiting element 115 is connected to a switching element 123, which may connect the output terminal 121 of the limiting element 115 to a rate limiting element 125 for imposing a rate limitation of the output signal VMax supplied to the output terminal 127.

In particular, the switching element 123 (and 223 in FIG. 2) receives a reset signal 124 (or 224 in FIG. 2). Thereby the reset signal 124 is 1, when the connection node voltage is not within the connection node limit voltage and this function is activated. When the reset signal 124 (or 224 in FIG. 2) is 1, the output at the terminal 121 of the limit element 115 of PI controller 100 (or 200 in FIG. 2) will be supplied to the rate limit element 125 (or 225 in FIG. 2). When the reset signal 124 (or 224 in FIG. 2) is 0, hard limits, e.g., 0.92 and 1.08, may be applied at the output terminals 127 and 227 for VMax and VMin, respectively.

The input signals Umax received at terminal 117 and Umin received at terminal 119, represent preliminary upper voltage limit and preliminary lower voltage limit, respectively, of the reference voltage to be supplied to the wind turbine.

In case the connection node voltage lies within a range defined by Umaxref and Uminref (representing a connection node upper limit voltage and a connection node lower limit voltage), the preliminary limit values may be given as in equation (1) above.

If the connection node voltage Umeas (representing a measured connection node voltage) lies outside the intended range of the connection node voltage (defined by Umaxref and Uminref), then the preliminary limit values Umax and Umin may be e.g. set as in equation (2) above.

The output signal VMax supplied to the output terminal 127 of the controller 100, is supplied to a limiting element of the reactive power controller illustrated in FIG. 3 according to an embodiment, in order to limit the reference voltage supplied to the wind turbine, as is described in detail further below.

FIG. 2 schematically illustrates a lower voltage limit bound controller 200 representing an arrangement for determining a limit value of a wind turbine reference operational variable according to an embodiment.

At a first input terminal 201, the connection node lower limit voltage Uminref is supplied. At a second input terminal 203 the actual measured connection node voltage Umeas is received. Using the difference element 205, a difference is formed between the signals received at the terminals 203 and 201 and supplied to a scaling element 207 and further to a scaling element 208. The result of the scaling element 208 is supplied to an adding element 209 as well as to a further scaling element 211, which supplies the result to an integrating element 213, which in turn supplies the result to the adding element 209.

The result of the adding element 209 is supplied to the limiting element 215, which limits the signal at its output terminal 221 to be within limits set by Umax (compare equations (1) and (2)) received at terminal 217 and Umin received at terminal 219. The result of the limiting element 215 is supplied to a switching element 223, which may connect the terminal 221 to a rate limiting element 225 for limiting a rate change of the output signal VMin supplied to the output terminal 227.

The output signal VMin is also used in the reactive power controller illustrated in FIG. 3, in particular at a limiting element for limiting the reference voltage output by the reactive power controller illustrated in FIG. 3.

Inside upper voltage limit controller 100 and lower voltage limit controller 200, the filtered measured voltage, Umeas, at PCC is compared to either $U_{minref}$ or $U_{maxref}$, the error is fed to a feedback controller, e.g. proportional-integration controller, as shown in FIG. 1 and FIG. 2. The output of voltage bound limit controller will be limited by Umin and Umax which is generated by equation (2).

The output signals from upper voltage bound limit controller and lower voltage bound limit controller, VMin and VMax, is used as voltage limit signals for reactive power controller as shown in FIG. 3.

FIG. 3 schematically illustrates a reactive power controller 300 representing an arrangement for determining a limit value of a wind turbine reference operational variable and controlling the wind turbine. The reactive power controller 300 illustrated in FIG. 3 receives at an input terminal 329 a reference reactive power Q_WFREF at the connection node defining an intended reactive power at the connection node, which is intended to be achieved.

Further, the controller 300 illustrated in FIG. 3, receives at an input terminal 331 the reactive power Q_PCC at the connection node representing the actual or measured reactive power at the connection node. The signal received at the terminal 331 is delayed using a delay element 333 and is supplied to a difference element 335, to which also the reference reactive power received at the terminal 329 is supplied via a switching element 337.

The result of the difference element 335 is supplied to a division element 339, which divides the signal received from the difference element 335 by the number of wind turbines connected to the connection node, wherein the number of wind turbines N_WTG is received at a terminal 341 and which is scaled by a scaling element 343.

The result of the division element 339 is supplied to a scaling element 343, which on the one hand supplies its result to an adding element 345 and on the other hand to another scaling element 347, which is supplied to another difference element 349. To the difference element 349 is also supplied a difference formed by another difference element 351, which forms the difference between the result of the adding element 345, and the output of the limiting element 353 (at the output terminal 355). The limiting element 353 is supplied with the result of the adding element 345.

The result of the division element 339 is supplied to a scaling element 343, which on the one hand supplies its result to an adding element 345 and on the other hand to another scaling element 347, which is supplied to another difference element 349. To the difference element 349 is also supplied a difference formed by another difference element 351, which forms the difference between the result of the adding element 345, and the output of the limiting element 353 (at the output terminal 355). The result of the difference element 349 is supplied to the integrating element 313, which integrates the difference of the signal and supplies is also to the addition element 345. The limiting element 353 is supplied with the result of the adding element 345.

Thereby, it is ensured that the output signal of the limiting element 353 at output terminal 355 is within the range defined by VMax and VMin. The result of the limiting element 353 at output terminal 355 is supplied to an output terminal 357 and in parallel supplied to a rate-limiting element 359, which limits a rate change of the output signal of the limiting element 353 to result in a signal U_WTREF provided at output terminal 361. U_WTREF represents a reference voltage for a wind turbine, which is supplied to a wind turbine controller or to a wind turbine converter for setting the voltage at the output of the wind turbine to correspond to the signal U_WTREF output at terminal 361.

The controller 300 receives at a further input terminal 330 another signal supplied to the switching element 337.

Instead of controlling the reference voltage of the wind turbine, also the reference reactive power of the wind turbine may be controlled according to an embodiment, wherein the reactive power controller 300 illustrated in FIG. 3, may be replaced by a respective controller outputting not the reference voltage U_WTREF but a reference reactive power.

Further, while the reactive power controller 300 illustrated in FIG. 3 is used to control the reactive power at the connection node, embodiments, namely the controller 100 and 200 illustrated in FIGS. 1 and 2, may also be applied or used for a voltage controller, or a power factor controller, to control the voltage or the power factor at the connection node, respectively.

Thereby, a respective limiting element may be supplied with the value VMax and VMin output at the terminals 127 and 227 of the controllers 100 and 200 illustrated in FIGS. 1 and 2, respectively.

In particular, the output of voltage bound limit controllers 100 and 200, i.e. VMax and VMin, may dynamically modify the limit of output of voltage controller 300. In some situation, one of voltage bound limit controller may replace reactive power controller to generate voltage reference for wind turbines.

The main goals of the reactive and voltage control are the stabilization of the node voltage and avoidance of violation of the maximum and minimum voltage levels.

In addition to this, methods and arrangements may:

limit voltage at PCC to the specified range required by grid code;

fulfill grid code requirement;

have a simple implementation;

require no additional cost;

be critical for weak grid to fulfill grid code requirement

Figure 4:
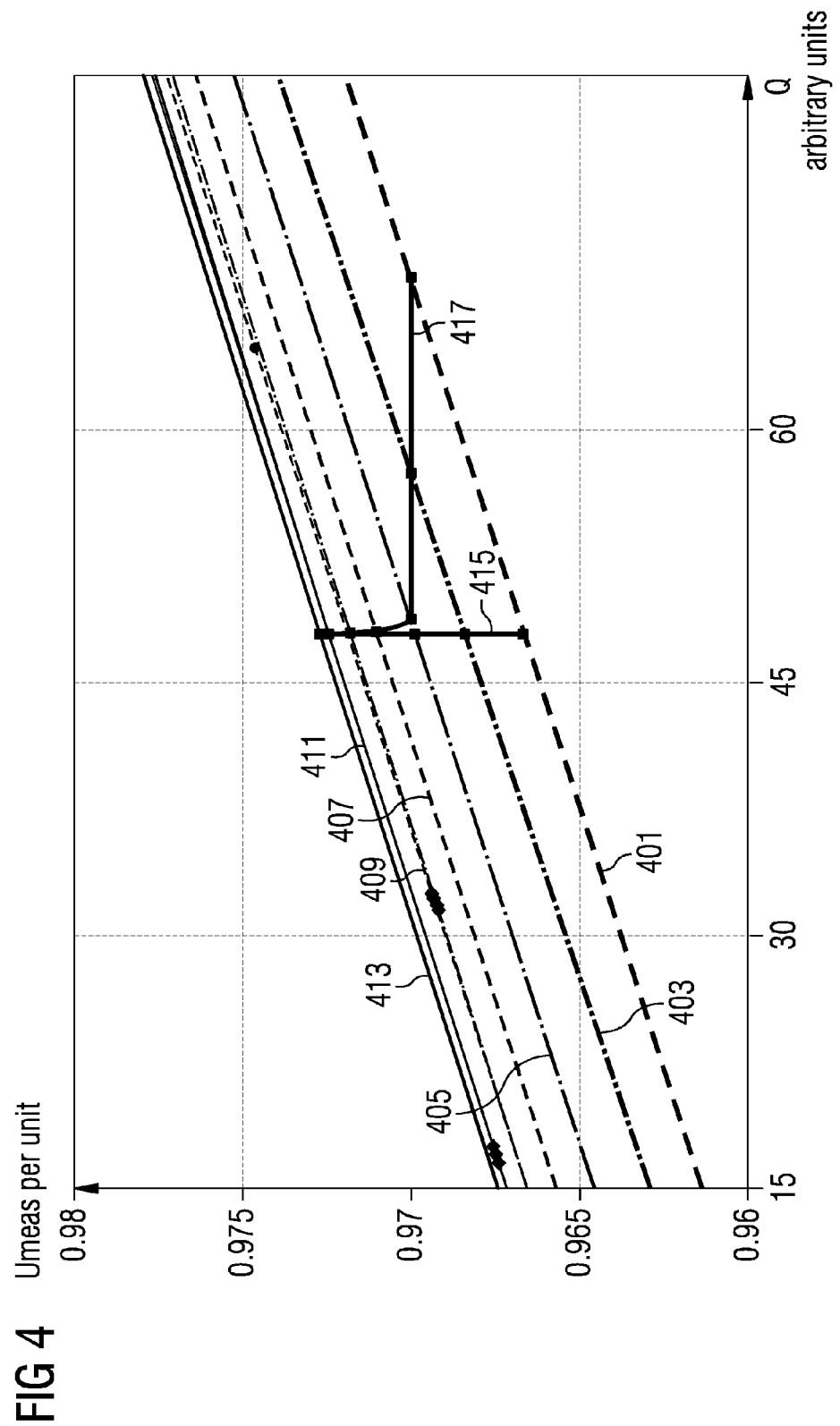
FIG. 4 illustrates graphs showing the voltage at the connection node in dependence of the reactive power at the connection node, while reactive power control is performed according to an embodiment.

FIG. 4 illustrates graphs of the relationships between the voltage Umeas at the connection node in per unit and the reactive power Q at the connection node. Thereby, the parallel lines 401, 403, 405, 407, 409, 411 and 413 represent relationships for the loadings 1, 0.9, 0.8, 0.7, 0.6, 0.4, and 0.1, respectively. Thereby, the loading is defined by the active power produced by the wind turbine in per unit values. For example, a loading of 1 (line 401) corresponds to the nominal active power produced by the wind turbine and a loading of 0.1 corresponds to 10% of the nominal active power produced by the wind turbine.

The intersections of the lines 401-413 with the line 415 represent the relationship between the voltage at the connection node and the reactive power at the connection node, when no voltage bound limit is applied as in the prior art. As can be seen, the voltage at the common node lies below the value of 0.97 for loadings 1, 0.9 and 0.8.

In contrast, when the reactive power control with voltage bound limit set to [0.97; 1.03] is performed according to an embodiment, the line 417 results such that for all loadings the voltage at the connection node stays above the lower limit value of 0.97. Thereby, local regulations may be met.

In the graphs illustrated in FIG. 4, reactive power control with voltage bound limit was performed (curve 417).

Figure 5:
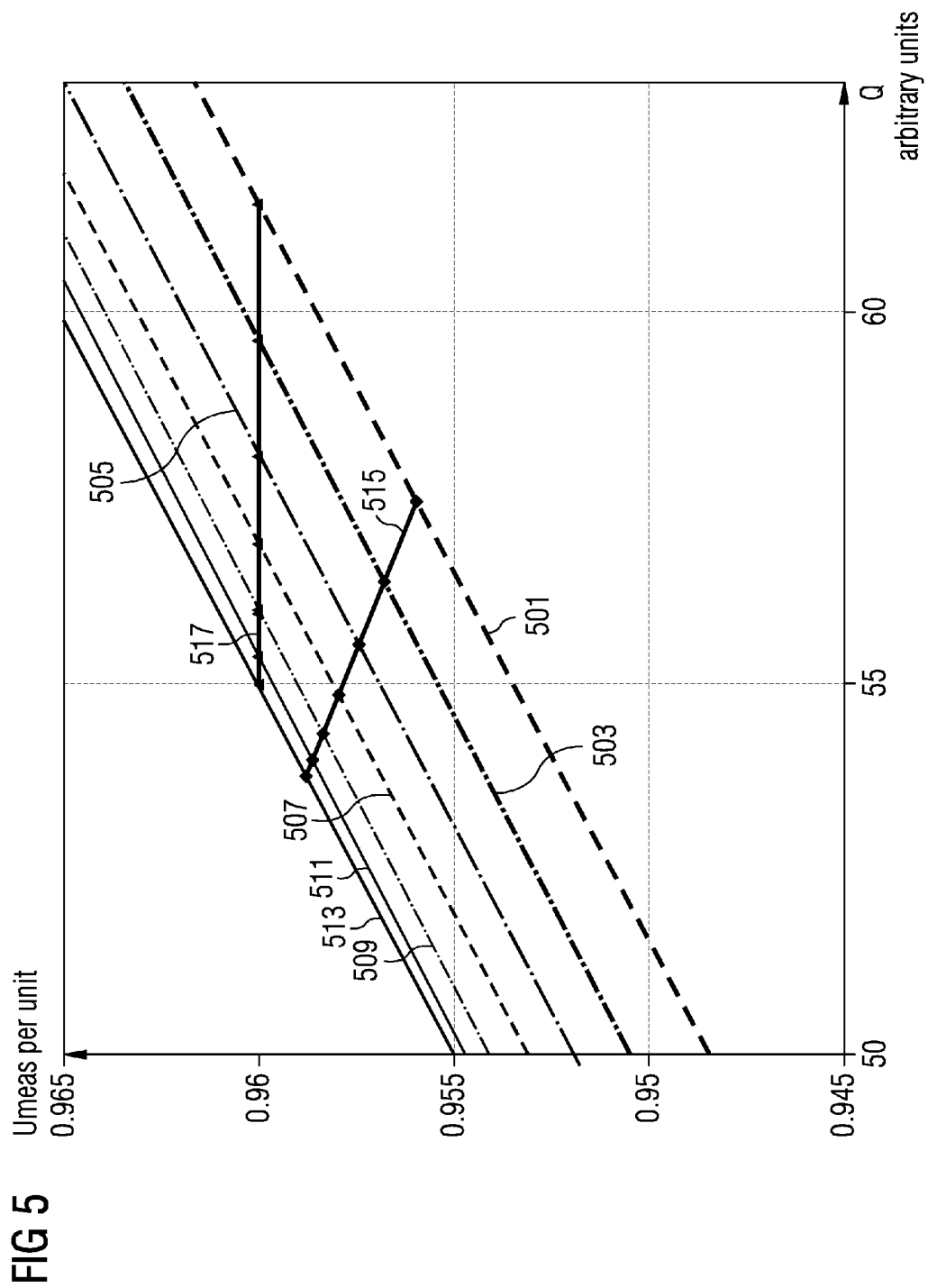
FIG. 5 illustrates graphs showing the voltage at the common node in dependence of the reactive power at the connection node, while a voltage control at the connection node is performed according to an embodiment.

FIG. 5 illustrates graphs showing the dependence of the actual or measured voltage Umeas at the connection node in per unit and the reactive power Q at the connection node. Thereby, the lines 501, 503, 505, 507, 509, 511 and 513 again represent the relationships for different loadings of 1.09, 0.8, 0.7, 0.6, 0.4 and 0.1, respectively, of the wind turbine.

In the graphs illustrated in FIG. 5, a voltage control at the connection node with voltage bound limit was performed as illustrated in curve 517, while the curve 515 represents the case, where voltage control was performed without bound limit as in the prior art.

As can be seen from FIG. 5, when voltage control with voltage bound limit is performed according to an embodiment (curve 517), the voltage at the connection node does not fall below the limit value of 0.96, while the voltage falls below this limit value, when a voltage control is performed according to a conventional method (curve 515).

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. A method for determining a limit value of a wind turbine reference operational variable, the wind turbine reference operational variable is reference operational variable of a wind turbine, the wind turbine and a plurality of wind turbines being connected to a point of common coupling to which a utility grid is connected, the method comprising:
    obtaining a first input signal indicative of a connection node limit voltage at the point of common coupling;
    obtaining a second input signal indicative of a connection node voltage by measuring one or more voltages between two or more phases at the point of common coupling;
    calculating the limit value of the wind turbine reference operational variable based on a difference between the first signal and the second signal, wherein the determined difference between the first signal and the second signal is used as a feedback signal supplied to a feedback controller, wherein the wind turbine reference operational variable is a wind turbine reference voltage at an output terminal of the wind turbine and the limit value of the wind turbine reference operational variable is a voltage limit of the wind turbine reference voltage, and wherein the wind turbine reference operational variable is a wind turbine reference reactive power at an output terminal of the wind turbine and the limit value of the wind turbine reference operational variable is a reactive power limit of the wind turbine reference reactive power, wherein the limit value of the wind turbine reference operational variable comprises an upper limit value of the wind turbine reference operational variable, wherein the first input signal comprises a first upper limit input signal indicative of an upper limit of the connection node voltage, wherein the limit value of the wind turbine reference operational variable comprises a lower limit value of the wind turbine reference operational variable, wherein the first input signal comprises a first lower limit input signal indicative of a lower limit of the connection node voltage; and
    controlling the reference operational variable of the wind turbine based on the determined limit value of the wind turbine reference operational variable, in particular such that the reference operation variable is within the determined limit value.

2. The method according to claim 1, scaling the difference to obtain a scaled difference; and integrating the scaled difference over a time interval to obtain an integrated scaled difference, wherein the determining the limit value of the wind turbine reference operational variable is based on the integrated scaled difference, and wherein in particular the limit value of the wind turbine reference operational variable is also based on the scaled difference.

3. The method according to claim 1, further comprising:
    obtaining a preliminary upper limit value of the wind turbine reference operational variable; and
    obtaining a preliminary lower limit value of the wind turbine reference operational variable,
    wherein the determining the limit value of the wind turbine reference operational variable is further based on the preliminary upper limit value and the preliminary lower limit value,
    wherein in particular the limit value is limited to be within a range defined by the preliminary upper limit value and the preliminary lower limit value.

4. The method according to claim 1, further comprising:
    limiting a rate change of the limit value of the wind turbine reference operational variable to a predetermined rate change range.

5. The method according to claim 3, further comprising:
    controlling the reference operational variable of the wind turbine based on the determined limit value of the wind turbine reference operational variable, in particular such that the reference operation variable is within the determined limit value.

6. The method according to claim 1, wherein the controlling is performable during at least one operational mode selected from the group consisting of: reactive power control at the point of common coupling; voltage control at the point of common coupling; and power factor control at the point of common coupling, wherein the operational modes are performable temporarily separated from each other.

7. The method according to claim 6, wherein during the reactive power control at the point of common coupling the reference operational variable of the wind turbine is further based on a reference reactive power at the point of common coupling and a measured reactive power at the point of common coupling, wherein during the voltage control at the point of common coupling the reference operational variable of the wind turbine is further based on a reference voltage at the point of common coupling and a measured voltage at the point of common coupling, and wherein during the power factor control at the point of common coupling the reference operational variable of the wind turbine is further based on a reference power factor at the point of common coupling and a measured power factor at the point of common coupling.

8. The method according to claim 5, wherein the preliminary upper limit value of the wind turbine reference operational variable is based on the reference operational variable of the wind turbine, and/or wherein the preliminary lower limit value of the wind turbine reference operational variable is based on the reference operational variable of the wind turbine.

9. The method according to claim 1,
wherein the obtaining the second input signal indicative of a connection node voltage comprises measuring the connection node voltage.

10. An arrangement for determining a limit value of a wind turbine reference operational variable, the wind turbine reference operational variable is reference operational variable of a wind turbine, the wind turbine and a plurality of wind turbines being connected to a point of common coupling to which a utility grid is connected, the arrangement comprising:
an input for obtaining a first input signal indicative of a connection node limit voltage at the point of common coupling and for obtaining a second input signal indicative of a connection node voltage by measuring one or more voltages between two or more phases at the point of common coupling;
and a determining section for determining the limit value of the wind turbine reference operational variable based on the first signal and the second signal and for determining a difference between the first input signal and the second input signal, wherein the determining the limit value of the wind turbine reference operational variable is based on the determined difference, wherein the determined difference between the first signal and the second signal is used as a feedback signal supplied to a feedback controller, wherein the wind turbine reference operational variable is a wind turbine reference voltage at an output terminal of the wind turbine and the limit value of the wind turbine reference operational variable is a voltage limit of the wind turbine reference voltage, and wherein the wind turbine reference operational variable is a wind turbine reference reactive power at an output terminal of the wind turbine and the limit value of the wind turbine reference operational variable is a reactive power limit of the wind turbine reference reactive power, wherein the limit value of the wind turbine reference operational variable comprises an upper limit value of the wind turbine reference operational variable, wherein the first input signal comprises a first upper limit input signal indicative of an upper limit of the connection node voltage, wherein the limit value of the wind turbine reference operational variable comprises a lower limit value of the wind turbine reference operational variable, wherein the first input signal comprises a first lower limit input signal indicative of a lower limit of the connection node voltage;
and
controlling the reference operational variable of the wind turbine based on the determined limit value of the wind turbine reference operational variable, in particular such that the reference operation variable is within the determined limit value.

\* \* \* \* \*